Patented Sept. 4, 1945

2,384,063

UNITED STATES PATENT OFFICE 2,384,063

AMINE TREATMENT OF ROSIN

László Auer, South Orange, N. J.

No Drawing. Application January 25, 1943,
Serial No. 473,546

16 Claims. (Cl. 260—106)

GENERAL STATEMENT

This invention relates to treatment of rosin and is particularly concerned with employment of aromatic amines or aromatic amino-compounds to modify and improve various properties and characteristics of rosin. The invention also relates to modified rosin products incorporating such amino-compounds.

The present application is a continuation-in-part of my copending application Serial No. 383,049, filed March 12, 1941, issued as Patent 2,309,088, January 26, 1943.

Rosin is a valuable raw material for many purposes but, for some uses, it is desirable to alter or improve various properties of rosin, so as to better fit them for such purposes.

For example, rosin is a common ingredient in plastic and coating compositions, for instance, in both pigmented and unpigmented varnishes, varnish bases, and the like.

Treatment of rosin with aromatic amines, especially with certain classes of amines identified more fully hereinafter, is of importance where the rosin is to be employed for certain purposes, for instance, in coating compositions, such as varnishes. More specifically, treatment of rosin in accordance with this invention improves the drying characteristics of varnishes made with such rosin. The treatment may also materially improve aging characteristics, water resistance and alkali resistance.

It is further an important characteristic of the treatment according to the present invention that with many of the agents, various modifications may be brought about in the characteristics of the rosin such as those mentioned just above, while retaining a relatively light color in the treated rosin product.

Briefly, the process of the invention involves heating the rosin in the presence of an amine, the heating being continued for a time sufficient to bring about the modifications desired. Before analyzing the nature of the process in greater detail, attention is here directed to the types of amines preferably employed according to this invention.

TREATING AGENT

In general the invention contemplates employment of aromatic secondary and tertiary amines. These may be mono-amines, di-amines, or other polyamines. The amines may, moreover, be of complex nature, incorporating groups and radicals of various types. The amines themselves or their substitution products, homologues and their derivatives, may also be employed in the form of their salts.

The general class of aromatic amines which may be employed in accordance with this invention are those in which at least 2 of the hydrogen atoms connected with the nitrogen atom are substituted by organic radicals. These may be represented by the following general formula, hereinafter identified as Formula I:

where
$R$ = grouping containing at least 1 aryl radical
$c$ = 0 or 1
$d$ = 1–4
$e$ = 1 or 2
$Y$ = nitro-, sulfo-, halo-, alkyl-, aryl-, aralkyl-, acyl-, aracyl- hydroxy, CHOH, CHO, carboxy, SH, CN, CO, CS or SO radicals, or sulfur or oxygen.
$f$ = 0–4.

As above noted, such amino-compounds may be employed as such or in the form of their salts.

More especially, the invention is concerned with the employment of aromatic amine compounds responding to the general formula above further modified as follows, the modified formula being hereinafter identified as general Formula II:

where
$R$ = at least 1 aryl radical
$b$ = 1–3
$X$ = nitro-, sulfo-, halo-, alkyl-, aryl-, aralkyl-, acyl-, aracyl-, hydroxy, CHOH, CHO, carboxy, SH, CN, CO, CS or SO radicals, or sulfur or oxygen
$a$ = 0–6
$c$ = 0 or 1
$d$ = 1–4
$e$ = 1 or 2
$Y$ = nitro-, sulfo-, halo-, alkyl-, aryl-, aralkyl-, acyl-, aracyl-, hydroxy, CHOH, CHO, carboxy, SH, CN, CO, CS or SO radicals, or sulfur or oxygen.
$f$ = 0–4.

Here again, either the compounds or their salts may be used.

In the foregoing formulas, it is to be understood that the term "aryl" is used to identify an aromatic ring plus hydrogen atoms.

Examples of various compounds coming within the foregoing general formulas are given just below.

First, as to general Formula II it may be noted that secondary amines and amine salts, responding to this formula are materials such as:

Diphenylamine sulfate
Diphenylamine hydrobromide
Diphenylamine trichloracetate
Diphenylamine
p-Nitroacetanilide
Phthalimide
Thiocarbanilide
2-phenylamino 8 naphthol 6 sulfonic acid Tertiary amines responding to general Formula II above are as follows:

Michler's ketone
Michler's hydrol
Benzylethylanilinesulfonic acid

Certain other amino-compounds of similar general nature are materials such as:

Hexamethylenetetramine

Secondary amines and amine salts, coming within the scope of general Formula I are illustrated by the following examples:

Diaminodiphenylamine sulfate
pp-Diaminodiphenylamine
Diaminofuchsonimine
pp-Diaminodiphenylurea
pp-Diaminodiphenylthiourea Complex tertiary amines coming within the scope of general Formula I are materials such as:

Eurhodine
Safranine
Diaminodiphenazine

Various of the foregoing compounds may also be classed as mixed amines, for instance:

Diaminodiphenylamine sulfate
pp-Diaminodiphenylamine
pp-Diaminodiphenylurea
pp-Diaminodiphenylthiourea
Diaminofuchsonimine
Diamino diphenazine
Safranine
Eurhodine It may be noted that certain specific compounds, particularly some of those which are more complex, may be classified under more than one group above, for instance in some cases a secondary or tertiary amine compound may also contain primary groups, etc.

Various of the classes of compounds, and also various individual members of the classes manifest somewhat different characteristics in the treatment, so that selection of the compounds to be used will depend on the particular characteristics desired in the modified rosin product. This is true not only with respect to selection as between secondary and tertiary amines, etc., but also as between mono-amines, di-amines, and other poly-amines.

It should further be noted that many of the compounds contain quite a variety of groups or radicals, so that the modification in properties of the product may originate from several different portions of the molecule. One radical or group of a complex compound may contribute one characteristic to the product, and another group or radical may at the same time contribute another characteristic to the final product. Thus composite modification of various properties may be attained by appropriate selection of the modifying agent.

With regard to selection of the modifying agent to be employed, it may be mentioned that for the purpose of preparing varnishes or varnish bases, it is advisable to select such amines as contribute to the properties desired in the varnish, such as good drying characteristics, and alkali and water resistance, while maintaining light color. Mono-secondary amines are useful for this purpose, diphenylamine or salts thereof which may yield diphenylamine under the conditions of the treatment being especially advantageous. Clarity of the solutions following cooking and thinning of the varnish base is also a desirable characteristic of various of the amines herein claimed and especially of mono-secondary amines, for instance diphenylamine.

Still further, it may be mentioned that notwithstanding the fact that various of the amines herein contemplated for use effect little if any reduction in acid value of the rosin by salt formation, varnish bases produced with such treated rosin products have surprisingly improved alkali and water resistance.

The iodine values of the treated products are not usually changed to any great extent, as compared with the same material heated to the same temperature and under the same treatment conditions, but without the amine compound.

Reference to varnish base herein means all or part of the varnish solids, i. e., the film forming ingredients of the varnish base. In use, of course, the varnish base or its dispersions (for instance solutions) may be either clear or pigmented.

TREATMENT CONDITIONS

With regard to treatment conditions it may be noted that anywhere from a trace, for instance .1% of the amino-compound up to about 10% is usually found satisfactory, from about .2% to about 5% normally yielding good results. For special purposes larger amounts may be used, for instance up to about 30%.

The temperature of treatment should be within a range extending from about 100° C. to about 350° C. but not above the point at which appreciable destructive distillation of the rosin will take place. Usually temperatures from about 200° C. to 310° C. are employed.

The time of treatment at the reaction temperature may be varied over a considerable range although the time usually need not be more than a few hours, for instance from about 1 hour to about 5 hours is required. In some cases modification is brought about quite rapidly and the batch may be permitted to cool almost immediately upon attaining the desired treatment temperature.

Frequently the reaction is desirably carried out in the absence of air, or out of contact with any substantial quantity of air. For this purpose the reaction may be carried out in a closed vessel, though not necessarily at a positive pressure, so that the gases or fumes of the reaction released from the modifying agent serve to exclude the air. For some purposes positive pressure may be used.

Vacuum is also effective for the purpose of excluding air, and in addition, reduction in contact of air may be brought about by blanketing the surface of the reaction mixture with some inert gas, such as $SO_2$, $CO_2$, or nitrogen, or by bubbling such gases through the mass. Where vacuum is used, a pressure, for instance, of about 100 mms. Hg to about 450 mms. Hg will be found effective, although higher or lower may be used. Vacuum serves to take off volatile reaction products, for instance water, if any is present. Whatever means or procedure is employed, it is often of advantage to so conduct the process as to reduce oxygen concentration in the reaction vessel and prevent entrance of fresh air or oxygen to the reaction mixture.

Various gases may be employed for their supplemental effect during the treatment procedure and gases for various purposes may either be employed as a blanket on the surface of the batch undergoing treatment or may be bubbled through the reaction mixture.

Supplemental treating agents may be present during the reaction, among which might be mentioned dissolution promoting agents of the type described in my issued Patent No. 2,293,038.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical compositions, though present in different physical states.

By modification I believe that the relationship or relative proportions of the dispersed phase and dispersion medium may be altered.

Whatever the exact nature of the chemical, colloidal and/or physical changes which are brought about, it will be found that generally the water and alkali resistance and various other properties of varnishes made with the modified products are improved.

In considering the starting materials on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pre-treated in various ways, or on mixed or chemically condensed materials incorporating rosin, since the reaction will take place wherever the rosin molecule is present provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulfur by the application of heat. The modified resin products secured in accordance with the foregoing, may be vulcanized as such, or in solutions, such as varnish solutions, (in the latter case with sulfur chloride).

EXAMPLES

In considering the following examples it may first be mentioned that in determining melting points the mercury method was used, and in determining iodine values the Wijs method was used.

EXAMPLE 1

1,000 grams of gum rosin X (Nelio brand) having acid and saponification values of 166 and 170, respectively, and 50 grams of diphenylamine were placed in a 3-liter round bottom distilling flask. Heat was applied with an electric heating mantle. As soon as the mixture was liquid a stream of dry, oxygen-free nitrogen gas was led into the liquid through a glass tube and allowed to bubble up through the liquid. The nitrogen gas was used to exclude air and so prevent oxidation of the material while heating it. A vacuum yielding 100 m. m. Hg pressure was maintained throughout the treatment. The temperature was raised to 220° C. and when the batch reached that temperature the heat was turned off. The product was allowed to cool to 200° C. and was then poured. It was fairly light in color and was brittle when cooled to room temperature. The acid value of the treated rosin product was 159.8. The saponification value of the product was 168.0.

300 grams of alkali refined linseed oil and 150 grams of the above rosin product were placed in a 1-liter aluminum beaker. Heat was applied with a gas flame and the temperature raised to 300° C. and held there. It was necessary to keep the varnish at this temperature for 3½ hours to make a 25 gallon oil-length varnish of brushing viscosity when thinned to 50% solids with mineral spirits. Driers were added to the thinned varnish and testing films applied to panels with Bird film applicators producing wet films of .0030 and .0015 in. thickness. The driers were added as naphthenates, the quantities being such as to yield 0.3% lead, 0.03% cobalt and 0.02% manganese (metal content based on quantity of oil present).

The thicker film was used in the alkali resistance test, this test comprising immersion in a 3% sodium hydroxide solution and observing the time required for the film to disintegrate. The thicker varnish film lasted for 72 hours in the alkali solution.

The thinner film was also tested in cold and in boiling water. This film recovered perfectly from a 24 hour immersion in cold water and also from a 15 minute immersion in boiling water.

The water and alkali tests were made after the films had stood for 48 hours.

Drying tests of films made with this varnish showed that the varnish was "set" in ¾ of an hour; was "dust free" in 1 hour; and was "print free" overnight. These drying tests were made with wet films of .0015 in. thickness.

Another varnish was made with heavy bodied linseed oil. The procedure was the same except for the heating time which was 2½ hours. This varnish gave very similar results on testing.

Both the water and the alkali resistance of these varnishes were better than similar varnishes prepared with untreated rosin and even with ester gum.

EXAMPLE 2

1,000 grams of gum rosin X, as above, and 50 grams of diphenylamine were placed in a 3-liter round bottom distilling flask. Heat was applied with an electric heating mantle. As soon as the mixture was liquid a stream of dry, oxygen-free nitrogen gas was led into the liquid through a glass tube and allowed to bubble up through the liquid. The nitrogen gas was used to exclude air and so prevent oxidation of the material while heating it. A vacuum yielding 100 m. m. Hg pressure was maintained throughout the treatment. The temperature was raised to 270° C. and held there for 3 hours. The heat was then turned off and the product allowed to cool to 200° C. before pouring it out. The rosin product was fairly light in color and was brittle when cooled to room temperature. The acid value of the treated product was 135.0, and the saponification value was 139.8. The iodine number of the product was 191.2.

300 grams of alkali refined linseed oil and 150 grams of the above treated product were placed in a 1-liter aluminum beaker. Heat was applied with a gas flame and the temperature raised to 300° C. and held there. It was necessary to keep the varnish at this temperature for 3 hours to make a 25 gallon oil-length varnish of brushing viscosity when thinned to 50% solids with mineral spirits. Driers, as in Example 1, were added to the thinned varnish and test panels were prepared as described above, the tests also being made in the same manner. The varnish film was "set" in ¾ of an hour; "dust free" in 1 hour; and "print free" overnight. The film recovered perfectly from a 24 hour immersion in cold water and also from a 15 minute immersion in boiling water. The thicker varnish film lasted for 72 hours in 3% alkali solution.

EXAMPLE 3

1,000 grams of ester gum B (Stroock and Wittenberg) having an acid value of 7.5 and a melting point of 99.0° C. and 20 grams of diphenylamine were placed in a round bottom distilling flask. Heat was applied with an electric heating mantle. As soon as the mixture was liquid a stream of dry, oxygen-free nitrogen gas was led into the liquid through a glass tube and allowed to bubble up through the liquid. The nitrogen gas was used to exclude air and so prevent oxidation of the material while heating it. A vacuum yielding 100 m. m. Hg pressure was maintained throughout the treatment. The temperature was raised to 290° C. and held there for 5 hours. The product was allowed to cool to 200° C. and was then poured. It was fairly light in color and was brittle when cooled to room temperature. The acid value of the product was increased quite surprisingly, to 107.0, which may have been due to splitting of the ester. The saponification value of the new resin was 152.2 and the iodine number was 150.3. The melting point was somewhat reduced.

300 grams of heavy bodied linseed oil and 150 grams of the above treated product were placed in a 1-liter aluminum beaker. Heat was applied with a gas flame and the temperature raised to 300° C. and held there. It was necessary to keep the varnish at this temperature for 3¼ hours to make a 25 gallon oil-length varnish of brushing viscosity when thinned to 50% solids with mineral spirits. Driers, as described under Example 1, were added to the thinned varnish and test films were made, as before. The varnish film was "set" in ¾ of an hour; "dust free" in 1 hour; and "print free" in 48 hours. The film recovered perfectly from a 24 hour immersion in cold water and also from a 15 minute immersion in boiling water. The thicker varnish film lasted for 8 hours in 3% alkali solution.

COMPARATIVE EXAMPLES 4 TO 4D

EXAMPLE 4

1,000 grams of gum rosin X, as in Example 1, and 50 grams of diphenylamine were placed in a round bottom distilling flask. Heat was applied with an electric heating mantle. As soon as the material was liquid dry, oxygen-free nitrogen gas was led into the liquid through a glass tube and the gas allowed to bubble up through the liquid for the remainder of the treatment. The temperature was raised to 290° C. and held there for 5 hours. A vacuum yielding 100 m. m. Hg. pressure was maintained throughout the treatment. At the end of 5 hours the heat was turned off and the resin allowed to cool to 200° C. before pouring it. The modified rosin product was fairly light in color and when cooled to room temperature was brittle. The acid value was 113.6; the saponification value 134.9; the iodine number 189.8; and the melting point 76.5° C.

EXAMPLE 4A

*Variation of temperature*

Exactly the same procedure was used but the temperature was held at 310° C. The acid value was lowered to 78.9. The saponification value was 128.4; the iodine number was lowered to 142.8; and the melting point rose to 85° C.

EXAMPLE 4B

*Variation of temperature*

Exactly the same procedure was used but the temperature was held at 270° C. The acid value was higher: 129.8; the saponification value was 133.7; the iodine number was 182.9; and the melting point was 76° C.

EXAMPLE 4C

*Variation of time and temperature*

Exactly the same procedure was used but the resin and diphenylamine were heated for 3 hours at 270° C. The acid value was 135.0, which was much higher; the saponification value was 139.8; and the iodine value was 191.2.

EXAMPLE 4D

*Variation of percent of diphenylamine used*

Exactly the same procedure was used but the quantity of diphenylamine was 20 grams. The acid value was 110.0; the saponification value was 131.2; the iodine number was lower: 162.3 and the melting point slightly higher: 78.5° C.

COMPARATIVE EXAMPLES 5 TO 8

In this series of examples WW-wood rosin (Newport Industries) was employed as the starting material, and all four of the group of examples were conducted under the same conditions except for difference in treatment temperature.

In all examples 5% diphenylamine was employed and the treatment was carried out under a vacuum pressure, the pressure being 100 mms. Hg. The treatment time in each case was 1 hour. In Example 5, the temperature was 150° C.; in Example 6, 200° C.; in Example 7, 250° C.; and in Example 8, 280° C.

Certain results of these treatments are shown in the following table:

|  | Untreated WW-wood rosin | Example 5 | Example 6 | Example 7 | Example 8 |
|---|---|---|---|---|---|
| Acid number | 166.4 | 151.0 | 156.0 | 157.8 | 147.4 |
| Saponification number | 168 | 159.0 | 160.2 | 160.8 | 148.2 |
| Iodine number | 200.5 | 201.5 | 215.0 | 202.5 | 204.2 |

EXAMPLE 9

300 parts of rosin were heated under vacuum with 15 parts of Michler's Hydrol, at a temperature of 260–270° C. for about 3 to 5 hours. The product secured was a hardened modified rosin material having good water resisting properties and, therefore, of advantage for use in water resistant varnishes.

COMPARATIVE EXAMPLES 10 AND 11

In these two examples WW wood rosin (Newport Industries) was employed, the said rosin having characteristics given in a table below.

In each example a batch of 300 grams of the rosin was heated with the modifying agent in a 1-liter distilling flask under atmospheric pressure, the "side-arm" of the flask being left open. The time of treatment was one hour and the temperature about 270° C.

In Example 10, 5% of diphenylamine was used, and in Example 11, 5% of diphenylamine sulfate.

Certain results of the foregoing comparative experiments are indicated in the following table:

|  | Untreated WW wood rosin | Example 10 | Example 11 |
|---|---|---|---|
| Acid number | 166.4 | 152.9 | 121.3 |
| Sapon. number | 172 | 163 | 131 |
| Iodine number | 192.2 | 194.5 | 158.6 |
| Melting point | 82.0° C. | 62.0° C. | 53.0° C. |
| Yield |  | 98.5% | 95% |
| Color | Light brownish yellow. | Light brownish yellow. | Light brownish yellow. |

The product of Example 11 was a plastic resin.

The foregoing illustrates, in a comparative manner, the effect of employing diphenylamine itself (Example 10) and a diphenylamine salt (Example 11), which latter yields a composite effect because of the presence of the sulfuric acid residue in the compound.

During rise in temperature in Example 11 (diphenylamine sulfate) the resin turned quite dark, probably as a result of the sulfuric acid splitting off from the diphenylamine sulfate. This indicates possible dissociation of the compound, so that the diphenylamine is released, in situ.

Notwithstanding the darkening during rise in temperature when employing the sulfate, after attaining a temperature of about 210° C. the product again cleared up and became quite light, similar to the product of Example 10, treated with diphenylamine.

While acid value, iodine value, and melting point of the two products are somewhat different, both products yield varnish films with improved properties, such as water and alkali resistance, and therefore are useful materials in coating compositions.

The sulfate portion of the compound used in Example 11 is apparently responsible for appreciable reduction not only in melting point, but also in iodine value and acid number.

EXAMPLE 12

This example was carried out in a manner similar to Examples 10 and 11 just above.

The same starting material was here employed (WW wood rosin of Newport Industries), the rosin being heated in a 1-liter distilling flask, with the side arm open. The batch of rosin comprised 300 grams and 5% of diphenylamine hydrochloride was employed as the modifying agent. The reaction mixture was held at 270° C. for 1 hour.

During rise in temperature, the re-agent apparently dissolved at 120° C. and a vigorous reaction took place, with some foaming, while the temperature rose from 120° C. to about 145° C. Foaming subsided as the temperature approached 160° C. and at this time the material was of a dark amber color.

Some sublimation occurred at about 165° C. and somewhat above.

As the reaction temperature rose further, approaching treatment temperature (270° C.) the material became very much lighter in color.

The yield was 96.4%, the product being a plastic resin and having an acid value of 131.5, a saponification value of 143, an iodine value of 172.5, and a melting point of 60.0.

The composite action of a halide salt of diphenylamine is here again indicated.

EXAMPLE 13

A batch of 300 grams of WW wood rosin (Newport Industries) was heated together with 15 grams of Safranine A ("bluish") in a 1-liter distilling flask, the temperature being 280° C., which temperature was held for 5 hours. For a short time just before the modified product was poured out, vacuum was applied, so as to take off excessive light distillates or water.

The bluish color of the Safranine remained in the mass during the reaction, the final product being of a blackish-blue hue. The yield was 95%.

The WW wood rosin had the same initial characteristics as above mentioned, and the treated product showed an acid number of 105.5, a saponification number of 111.0, an iodine number of 132.2, and melting point at 53.5° C.

Here, again, the effects of several different groupings or radicals of the modifying agent are indicated. Safranine, being a chlorine containing amino-compound having both di-primary and di-tertiary groups, yields a product displaying characteristics resulting not only from the amino-groups, but also from the halide, which latter apparently resulted in the appreciable decrease in melting point, and is at least partly responsible for the reduction in acid number.

I claim:

1. A process for modifying the properties of rosin, comprising heating the rosin to a temperature between about 100° C. and about 310° C. in the presence of from 2% to 10% of an aromatic secondary amino-compound.

2. A process in accordance with claim 1 in which said compound is a mono-amino-compound.

3. A process in accordance with claim 1 in which said compound is a poly-amino-compound.

4. A process in accordance with claim 1 in which said compound is a di-amino-compound.

5. A process in accordance with claim 1 in which the quantity of said amino-compound is from 2% to 5%.

6. A process in accordance with claim 1 in which the treatment temperature is between about 200° C. and 310° C.

7. A process for modifying the properties of rosin, comprising heating the rosin to a temperature between about 100° C. and about 310° C. in the presence of from 2% to 10% of an aromatic amino-compound selected from the class consisting of diphenylamine; its substitution products having in a phenyl group a substituent selected from the class consisting of nitro-, sulfo-, halo-, alkyl-, aryl, aralkyl, acyl-, aracyl-, OH, SH, CN, CO, CS and SO radicals, and sulfur and oxygen; and salts of disphenylamine and of said substitution products thereof.

8. A process in accordance with claim 7 in which said amino-compound is diphenylamine.

9. A process in accordance with claim 7 in which said amino-compound is a diphenylamine salt.

10. A process in accordance with claim 7 in which said amino-compound is a diphenylamine hydro-halide.

11. A process in accordance with claim 7 in which the temperature is at least 200° C.

12. A process in accordance with claim 7 in which the quantity of amino-compound used is from 2% to 5%.

13. A modified rosin comprising rosin reacted with from about 2% to about 10% of an aromatic amino-compound selected from the class consisting of: diphenylamine; its substitution products having in a phenyl group a substituent selected from the class consisting of nitro-, sulfo-, halo-, alkyl-, aryl-, aralkyl-, acyl, aracyl-, OH, SH, CN, CO, CS and SO radicals, and sulfur and oxygen; and salts of diphenylamine and of said substitution products thereof.

14. A modified rosin comprising rosin reacted with from about 2% to about 10% of diphenylamine.

15. A process for modifying the properties of rosin comprising heating the rosin to a temperature between about 100° C. and about 310° C. in the presence of from about 2% to about 10% of an aromatic amino-compound selected from the class consisting of amino-compounds having the following general formula, and salts thereof:

$$[X_a-R_b(NH_c)_d]_e-Y_f$$

where

R = at least 1 aryl radical
$b = 1-3$
X = a substituent selected from the class consisting of nitro-, sulfo-, halo-, alkyl-, aryl-, aralkyl-, acyl-, aracyl-, hydroxy, CHOH, CHO, carboxy, SH, CN, CO, CS and SO radicals, and sulfur and oxygen
$a = 0-6$
$c = 0$ or $1$
$d = 1-4$
$e = 1$ or $2$
Y = a substituent selected from the class consisting of nitro-, sulfo-, halo-, alkyl-, aryl-, aralkyl-, acyl-, aracyl-, hydroxy, CHOH, CHO, carboxy, SH, CN, CO, CS and SO radicals, and sulfur and oxygen
$f = 0-4$.

16. A process in accordance with claim 15 in which the amino-compound is a tertiary amino-compound.

LÀSZLÓ AUER.